United States Patent [19]

Tamaru

[11] Patent Number: 4,933,544

[45] Date of Patent: Jun. 12, 1990

[54] TOUCH ENTRY APPARATUS FOR CATHODE RAY TUBE WITH NON-PERPENDICULAR DETECTION BEAMS

[75] Inventor: Hideshi Tamaru, Kanagawa, Japan

[73] Assignee: Sony Corporation, Tokyo, Japan

[21] Appl. No.: 300,333

[22] Filed: Jan. 23, 1989

[30] Foreign Application Priority Data

Jan. 29, 1988 [JP] Japan .................................. 63-019383

[51] Int. Cl.⁵ .............................................. H01J 40/14
[52] U.S. Cl. ..................................... 250/221; 340/712
[58] Field of Search ............................ 250/221, 222.1; 340/712, 706; 341/31, 20

[56] References Cited

U.S. PATENT DOCUMENTS

| | | | |
|---|---|---|---|
| 3,764,813 | 10/1973 | Clement et al. ..................... | 250/221 |
| 3,775,560 | 11/1973 | Ebeling et al. ........................ | 178/18 |
| 4,198,623 | 4/1980 | Misek et al. .......................... | 340/706 |
| 4,247,767 | 1/1981 | O'Brien et al. ...................... | 250/221 |
| 4,517,559 | 5/1985 | Deitch et al. ........................ | 340/712 |

Primary Examiner—David C. Nelms
Assistant Examiner—George Beck
Attorney, Agent, or Firm—Philip M. Shaw, Jr.

[57] ABSTRACT

A touch panel apparatus which, when attached to a display having a substantially cylindrical display surface, reduces the effects of parallax by having a first set of plural light source - photo-detector pairs provided adjacent the cylindrical display surface for generating and detecting a first set of parallel light beams passing across the cylindrical display surface of the display, a second set of plural light source photo-detector pairs provided adjacent the cylindrical display surface for generating and detecting a second set of parallel light beams passing across the cylindrical display surface of the display, wherein the first and second sets of light beams are non-parallel relative to the principal direction of cylindrical curvature of the cylindrical display surface, and a process circuit connected to the first and second sets of light source - photo-detector pairs for determining coordinates by detecting interrupted light beams.

10 Claims, 7 Drawing Sheets

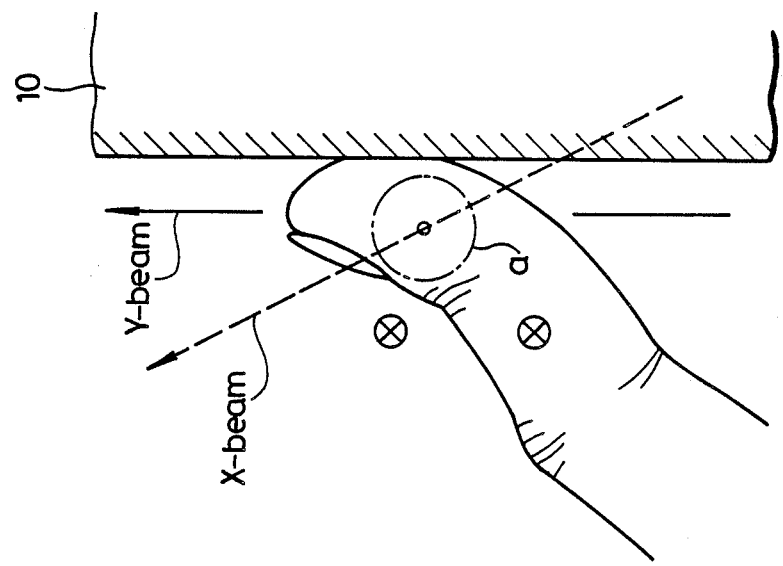
FIG. 7
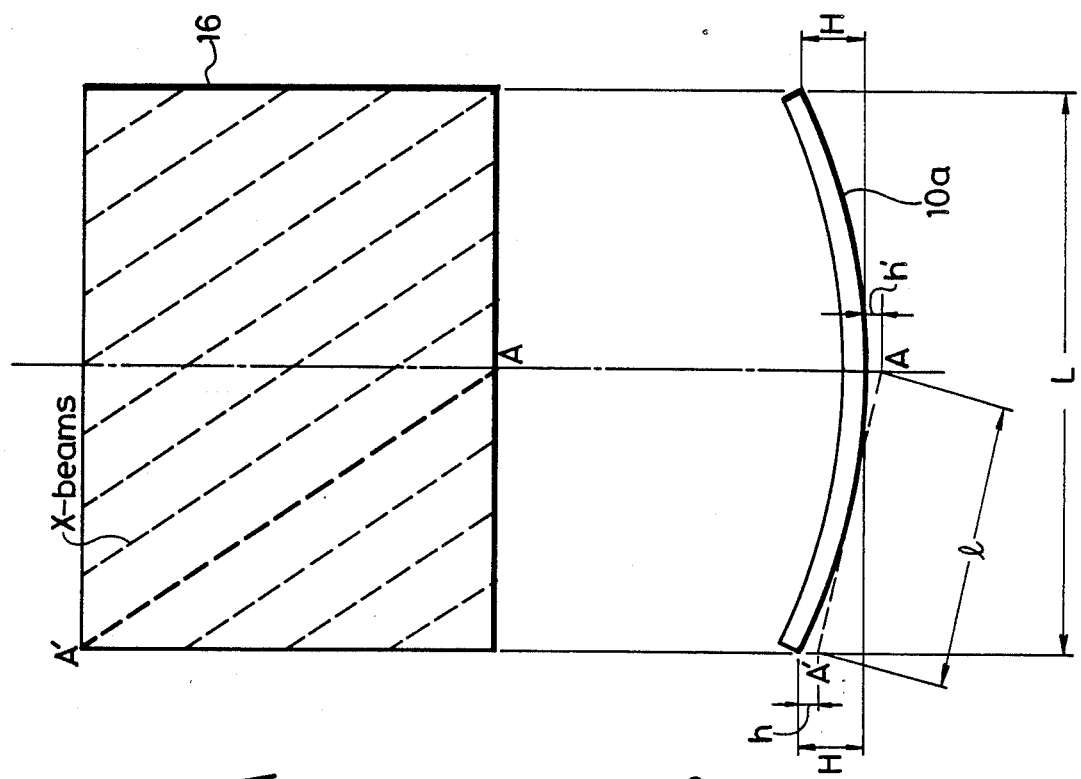
FIG. 6A
FIG. 6B

TOUCH ENTRY APPARATUS FOR CATHODE RAY TUBE WITH NON-PERPENDICULAR DETECTION BEAMS

BACKGROUND OF THE INVENTION

1. Field of the Invention

This invention is directed generally to a coordinate detection device employing a plurality of infra-red light beams, and particularly to such a device suitable for a touch control for a display device having a curved display surface.

2. Description of the Prior Art

A touch panel system employing a plurality of light beams is well-known and described in U.S. Pat. Nos. 3,764,813, 3,775,560, etc. Such a touch panel system generally consists of a coordinate detection device and a display device, and forms a man-machine interface for many kinds of computer systems.

Specifically, as described in the above-mentioned U.S. patents, a plurality of light emitting diodes (LED) are linearly arranged on a printed circuit board located on one side of the display screen of a display device such as a cathode ray tube (CRT) and emit infra-red light beams which are received by a plurality of photo-transistors linearly arranged on a printed circuit board located on the opposite side of the display screen. Further, a plurality of light emitting diodes (LED) linearly arranged on a printed circuit board located on the bottom side of the display screen emit infra-red light beams which are received by a plurality of photo-transistors linearly arranged on a printed circuit board located on the top side of the display screen, thereby forming a grid of the infra-red light beams. Each of the LED and photo-transistor pairs is assigned a different address.

It can be known which of the LEDs emits the light beam and which of the photo-transistors on the opposite side detects the light beam by sequentially specifying the address to change the respective LEDs and the photo-transistors coupled therewith to form the pairs. A touch on the display screen with a finger or a pen causes interruption of a certain infra-red light beam. The X and Y coordinates at the location where the light beam is interrupted are transferred to a host computer to determine the touched position. The touch panel system is constructed such that the light beam is interrupted by a touch on the optical grid plane formed of the infra-red beams so that the sensing plane (optical grid plane) is made even, i.e. flat.

Since the above-mentioned conventional optical touch panel device has an even sensing plane, if it is combined with a CRT having a curved display surface, a defect is encountered in that parallax is caused in peripheral portions of the CRT. For this reason, instructions for input data cannot be displayed on the CRT in a fine manner. Also, there is the possibility of malfunction. Such a parallax is caused by the fact that the infra-red light beams project in straight lines over the curved display screen of the CRT so that the infra-red light beams pass near the display screen at its central portion but far from the display screen in the vicinity of its edges. Therefore, even if the operator touches a point near an edge of the display screen, parallax makes it difficult to interrupt the infra-red light beam corresponding to the desired point to be touched.

As a parallax free touch panel system, there has been proposed a technique described in U.S. Pat. No. 4,198,623. However, the technique shown in the above U.S. patent specification makes the control circuit complicated and also provides only insufficient countermeasures against the parallax. Moreover, the increased thickness of the coordinate detection system gives the operator unsuitable feeling.

OBJECTS AND SUMMARY OF THE INVENTION

Accordingly, it is an object of the present invention to provide a novel coordinate detection device using light beams.

It is another object of the present invention to provide a novel coordinate detection device which is provided with a curved detection plane formed of an optical beam grid.

It is yet another object of the present invention to provide a novel touch panel apparatus using a coordinate detection device which is provided with a curved detection plane.

It is a further object of the present invention to provide a coordinate detection device suitable for use in a cathode ray tube provided with a cylindrically curved square display screen, for example, a TRINITRON brand tube which is manufactured by Sony Corporation. (TRINITRON is a registered trade mark of Sony Corporation).

According to the present invention, there is provided a touch panel apparatus to be attached to a display device having a substantially cylindrical display surface, comprising:

a first set of plural light source—photo-detector pairs for generating and detecting a first set of parallel light beams passing across the cylindrical display surface of the display;

a second set of plural light source—photo-detector pairs for generating a second set of parallel light beams passing across the cylindrical display surface of the display, wherein the first and second sets of light beams are non-parallel to a plane which is perpendicular to the cylindrical axis of the cylindrical display surface; and a process circuit connected to the first and second sets of light source—photo-detector pairs for determining coordinates by detecting interrupted light beams.

These and other objects, features and advantages of the present invention will become apparent from the following detailed description of the preferred embodiment taken in conjunction with the accompanying drawings, throughout which like reference numerals designate like elements and parts.

BRIEF DESCRIPTION OF THE DRAWINGS

FIGS. 6A and 6B are diagrams used for explaining parallax;

FIG. 7 is a diagram showing how the effect of parallax occurs in a practical use;

DETAILED DESCRIPTION OF THE PREFERRED EMBODIMENTS

Figure 1:
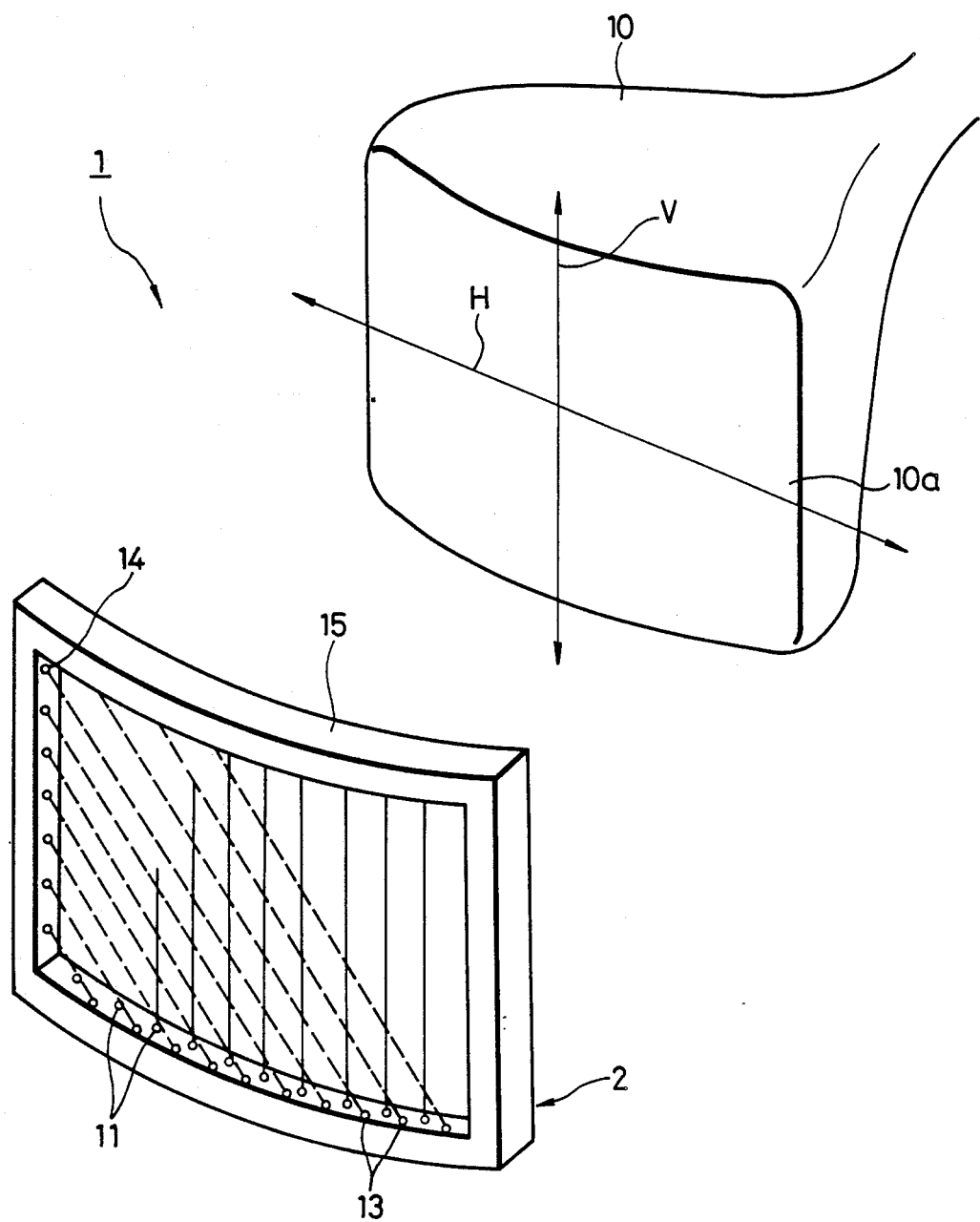
FIG. 1 is a perspective, exploded view of a first embodiment of a touch panel apparatus according to the present invention.

A touch panel apparatus 1 according to the present invention consists of a cathode ray tube (CRT) 10 and a coordinate detecting device 2, as shown in FIG. 1. The display surface 10a of the CRT 10 has a cylindrical curvature only in the lateral direction (indicated by H in FIG. 1) and has no curvature in the vertical direction (indicated by V in FIG. 1). Printed circuit boards, though not shown, are located along the four sides of the display surface 10a. On the printed circuit board on the bottom side, a plurality of light emitting elements, for example, light emitting diodes 11 are aligned along the curved plane (X-direction) of the CRT 10. On the printed circuit board on the top side, a plurality of light receiving elements, for example, photo-transistors 12 (FIG. 5) are aligned opposite to the light emitting diodes 11 in a photo detecting or coupling relationship.

The beams directed from the light emitting diodes 11 to the photo-transistors 12 are beams (Y beams) for detecting a position in the horizontal direction. The light emitting diodes 11 are scanned by a selector provided in the printed circuit board, as will be later referred to. The photo-transistors 12 are also scanned by a selector provided in the printed circuit board, in correspondence with the scanning of the light emitting diodes 11. A position in the non-linear direction, that is, the horizontal direction, is detected optically by light source—photo-detecting pairs formed of the light emitting diodes 11 and the oppositely aligned photo-transistors 12.

On the printed circuit boards on the bottom and right sides, a plurality of light emitting elements, for example, light emitting diodes 13 are aligned, while a plurality of light receiving elements, for example, photo-transistors 14 are aligned on the printed circuit boards on the left and top sides so as to establish a photo detecting relationship with beams emitted in a leftwardly skewed direction opposite to the light emitting diodes 13. The leftwardly skewed beams directed from the light emitting diodes 13 to the photo-transistors 14 are beams (X beams) for detecting a vertical position. Also in this case, the light emitting diodes 13 are scanned by a selector provided in the printed circuit board, while the photo-transistors 14 are similarly scanned by a selector provided in the printed circuit board in correspondence with the scanning of the light emitting diodes 13.

A position in the vertical direction is detected by light source—photo detecting pairs formed of the light emitting diodes 13 and the oppositely aligned photo-transistors 14 in an optical fashion.

Incidentally, all of the light emitting diodes 11 and 13 and the photo-transistors 12 and 14 are positioned such that the beams (Y and X beams) therebetween will not be interrupted by the surface of the CRT 10.

The coordinate detecting device 2 thus constructed is incorporated in a bezel 15 and then integrated with the CRT 10 to form the touch panel apparatus 1.

Figure 2:
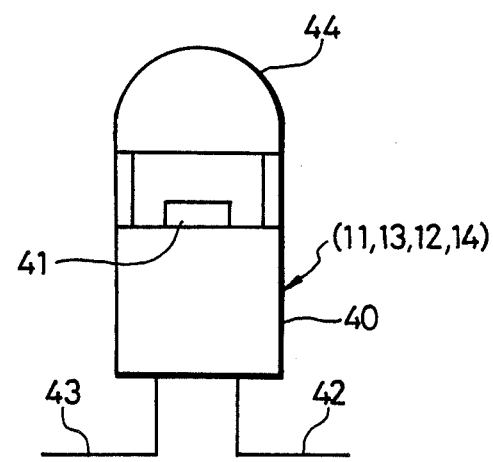
FIG. 2 is a diagrammatic side view showing the construction of a light receiving element employed in the present invention.

FIG. 2 shows an example of the light emitting diodes 11 and 13 and the photo-transistors 12 and 14 used as light emitting elements and light receiving elements in the present embodiment. In FIG. 2, reference numeral 40 designates a case, 41 a pellet, 42 an anode electrode terminal or a collector electrode terminal and, 43 a cathode electrode terminal or an emitter electrode terminal. In the present embodiment, the case 40 is provided at its top end with a light collecting means, for example, a lens 44 such that a maximal radiation sensitivity is available to the light emitting elements and a maximal sensitivity to the infra-red beams from the light emitting diodes 11 or 13 as light emitting elements is available to the light receiving elements.

Figure 3:
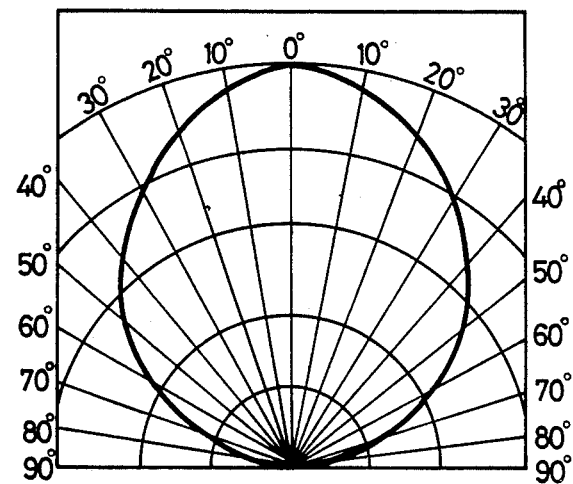
FIG. 3 is a graph showing the directional characteristics of a light emitting element employed in the present invention.
Figure 4:
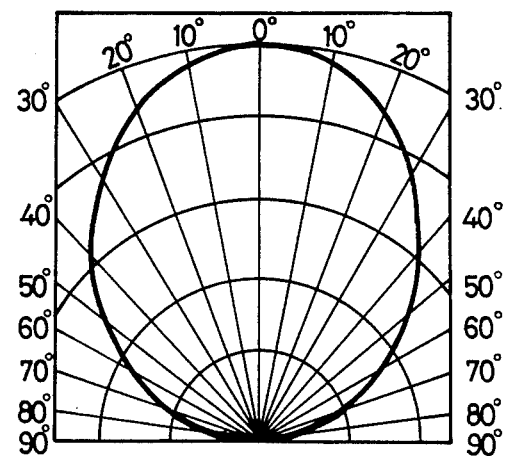
FIG. 4 is a graph showing a directional characteristic of the light receiving element depicted in FIG. 2.

By thus providing the lens 44 on the top end of the case 40, light emitting diodes 11 and 13 show a directional characteristic as illustrated in FIG. 3, and the photo-transistors 12 and 14 show a directional characteristic to the infra-red beams from the light emitting diodes 11 and 13 as shown in FIG. 4.

Figure 5:
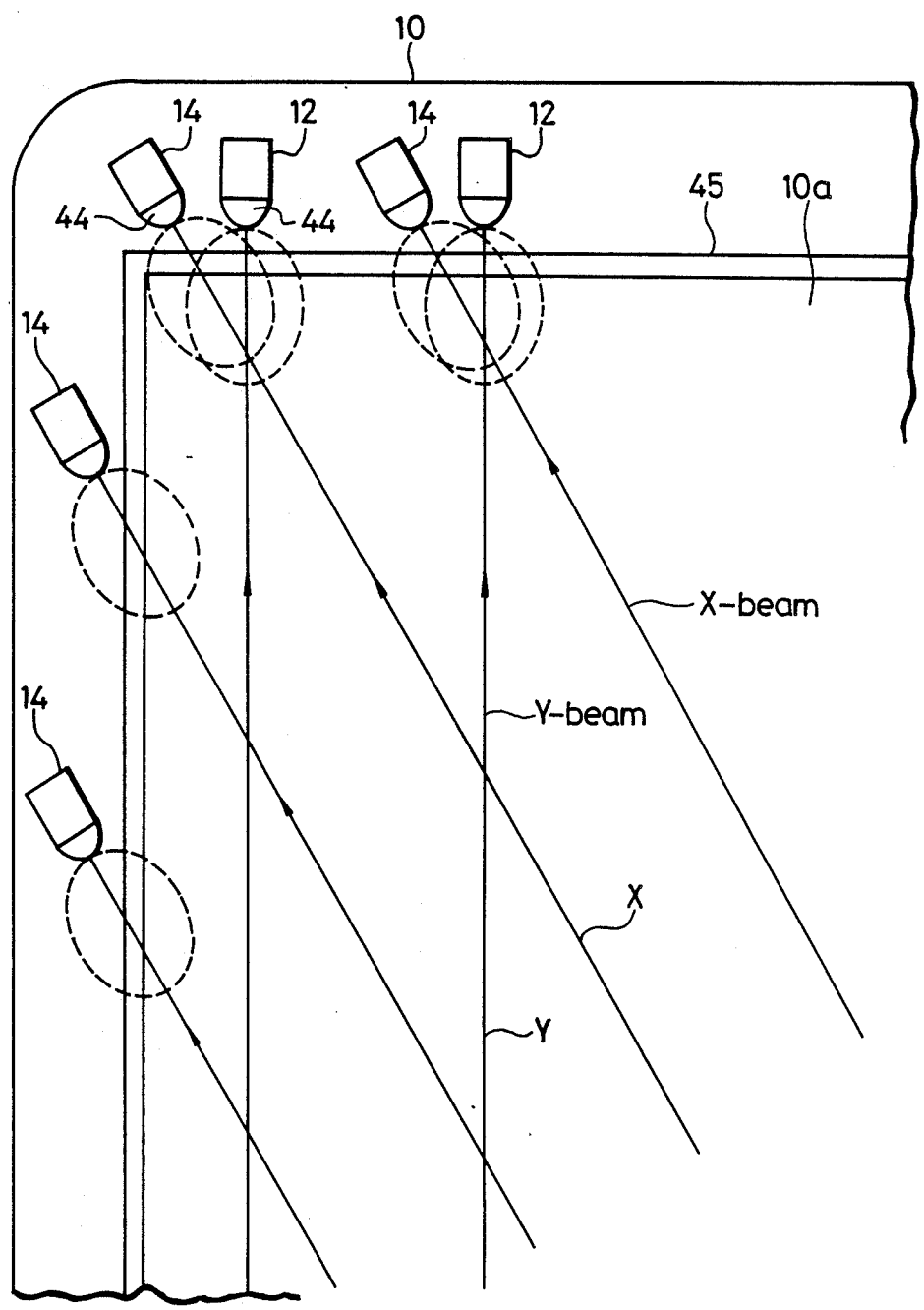
FIG. 5 is an enlarged, diagrammatic front view showing a main portion of the coordinate detection device.

FIG. 5 shows an alignment of the photo-transistors 12 and 14 in an enlarged scale, wherein reference numeral 45 designates an infra-red filter.

Since the photo-transistors 12 and 14 are provided at the top end thereof with the lens 44 as the light collecting means as described above, the respective photo-transistors 12 and 14 have maximal sensitivity characteristics to the infra-red beams as indicated by broken lines in FIG. 5.

The photo-transistors 12 and 14 on the left and top side are respectively provided with the lens 44 as a light collecting means such that they have the maximal sensitivity in the direction of the corresponding light emitting diodes 11 and 13 on the right and bottom side which form the light detecting pairs with the former, the photo-transistors 12 and 14 can receive the infra-red beams from the light emitting diodes 11 and 13 efficiently without being disturbed by rays from the outside. Thus, the provision of the light collecting lens 44 protects the photo-transistors 12 and 14 from external disturbance and allows the same to receive the infra-red beams with a high efficiency.

Since the CRT 10 has the cylindrical display surface 10a as described above, the relative placement of the light emitting diodes 11 and photo-transistors 12 is chosen so that the detecting plane formed of the light beams emitted from the light emitting diodes 11 to the photo-transistors 12 for detecting the coordinates in the X direction is cylindrically curved so as to be made parallel to the display surface 10a, thus preventing the parallax problem.

However, the detecting plane for detecting the coordinates in the Y direction still causes the parallax problem. To reduce this parallax problem, the light beams are emitted from the light emitting diodes 13 to the photo-transistors 14 in a direction leftwardly skewed with respect to the display surface 10a.

Next an explanation will be given of how the parallax of the X beams in the edge portions of the display surface can be reduced by arranging the light emitting diodes 13 and the photo-transistors 14 in a manner such that they are optically connected in an oblique direction with respect to the cylindrical display surface 10a of the CRT 10, with reference to FIGS. 6 and 7.

Assuming a square display area 16 displayed on the CRT 10 as shown in FIG. 6A, the beams (X beams) between the light emitting diodes 13 and the photo-transistors 14 obliquely directed as indicated by broken lines in the display area 16. A typical skewed beam, indicated by A—A', is shown in comparison with the curvature of the display surface 10a of the CRT 10 in FIG. 6B. In FIG. 6B, reference letter L represents the length of the display surface 10a in its curved direction, and l the projected length (beam span) of the skewed beam A—A' in the horizontal direction (one side of the display area). It can be seen from the drawing that the maximal distance between the skewed beam A—A' and the display surface 10a is h in the edge portion thereof or h' in the central portion. On the other hand, the maximal distance from a point on the line horizontally extended from the center of the display surface 10a, that is, the maximal distance from the horizontal beam of a conventional orthogonal beam system to the display surface 10a, is H. It can be clearly seen that H is far larger than h or h' (H$\gg$h, h') from FIG. 6B as well as from a comparison between the maximal distances H and h or h'. It will therefore be understood that the parallax is largely reduced by the present invention compared to that of the conventional device.

Since the envelope plane formed by the skewed beams tends to curve along the cylindrically curved display surface 10a, it is possible to form a plane substantially parallel to the display surface 10a of the CRT 10. It can be also understood from this respect that the parallax is reduced.

Assuming that the ratio of width to height of the display area 16 is selected as 4:3, the relationship between the projected length (beam span) l of the skewed beams in the horizontal direction and the maximal distance h between the beams and the display surface 10a of the CRT 10 are as shown in the following table:

| Beam Span (l) | 12" CRT | 19" CRT |
| --- | --- | --- |
| Length L in curved direction (prior art) | about 15 mm | about 26 mm |
| Length in vertical direction (3L/4) | about 8.4 mm | about 14.5 mm |
| Length of L/2 | about 3.7 mm | about 6.4 mm |

Also from the above table, it can be understood that as the projected length l of the skewed beams in the horizontal direction (one side of the display area) is shorter with respect to the length L in the curved direction, the distance h is smaller, so that the parallax is reduced.

The side view of FIG. 7 shows a relationship between the Y beam and the X beam (skewed beam) in the left and right edge portions of the display surface 10a of the CRT 10 when a finger actually touches the display surface 10a. A broken-line circle a indicates the beam detecting position (area) according to the present invention. The encircled X, however, indicates the position of the beams in a conventional orthogonal beam system for detecting the vertical direction. It can be seen from FIG. 7 that the use of the skewed beam can reduce the parallax in comparison with the conventional system.

In practical use the coordinate system (oblique coordinate system) of the touch panel device which is formed of the Y beam in the linear direction (vertical direction) of the cylindrical display surface of the CRT and the X beam oblique to the Y beam is preferably converted to an orthogonal coordinate system by a coordinate transformation method.

One coordinate transformation method is to provide a ROM in which is stored a conversion table of objective coordinate values (H, V) which correspond to the preliminary coordinate values (MY, NX) of a position where the horizontal position detecting beam (Y beam) and the vertical position detecting beam (X beam) oblique to the former are interrupted by a finger to effect the following conversion:

$$(MY, NX) \rightarrow (H, V)$$

Figure 8:
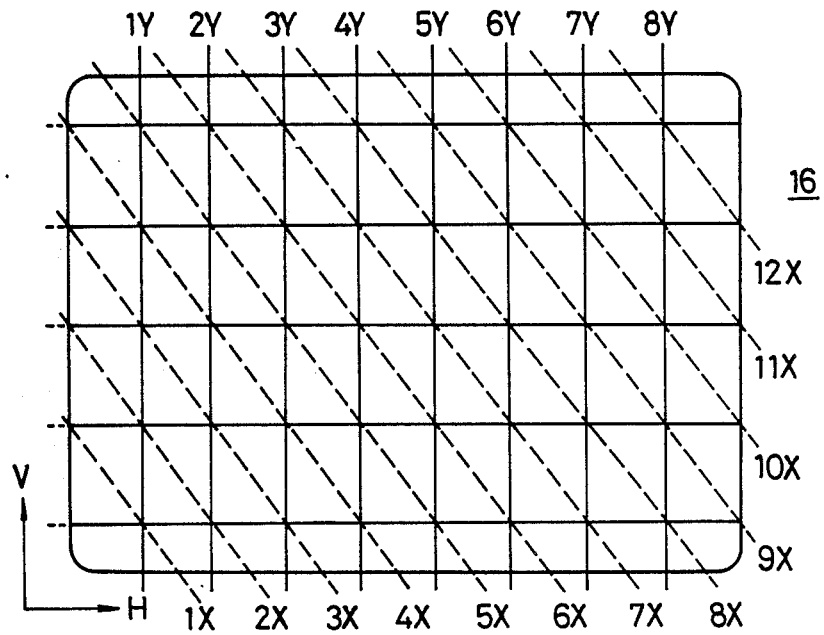
FIG. 8 is a diagram used for explaining a coordinate transformation.

Another method is to convert the detected preliminary coordinate values (MY, NX) to objective coordinate values by calculations using the two preliminary coordinate values. Specifically with reference to a display area 16, for example, as shown in FIG. 8 wherein the skewed beams 1X, 2X . . . NX are skewed with respect to the Y beams 1Y, 2Y . . . MY in the vertical direction by an angle such that the skewed beams are displaced by one pitch relative to the Y beams, the objective coordinate values (H, V) are obtained by substituting MY for the H coordinate value and calculating $V = NX\text{-}MY + 1$ for the V coordinate value.

In the above explanation, one coordinate value (one-dimensional value) corresponds to one beam. However, when two adjacent beams are simultaneously interrupted, the signal processing may be effected as if a beam (preliminary beam) exists in the middle of the interrupted beams to derive the objective coordinate values.

Figure 9:
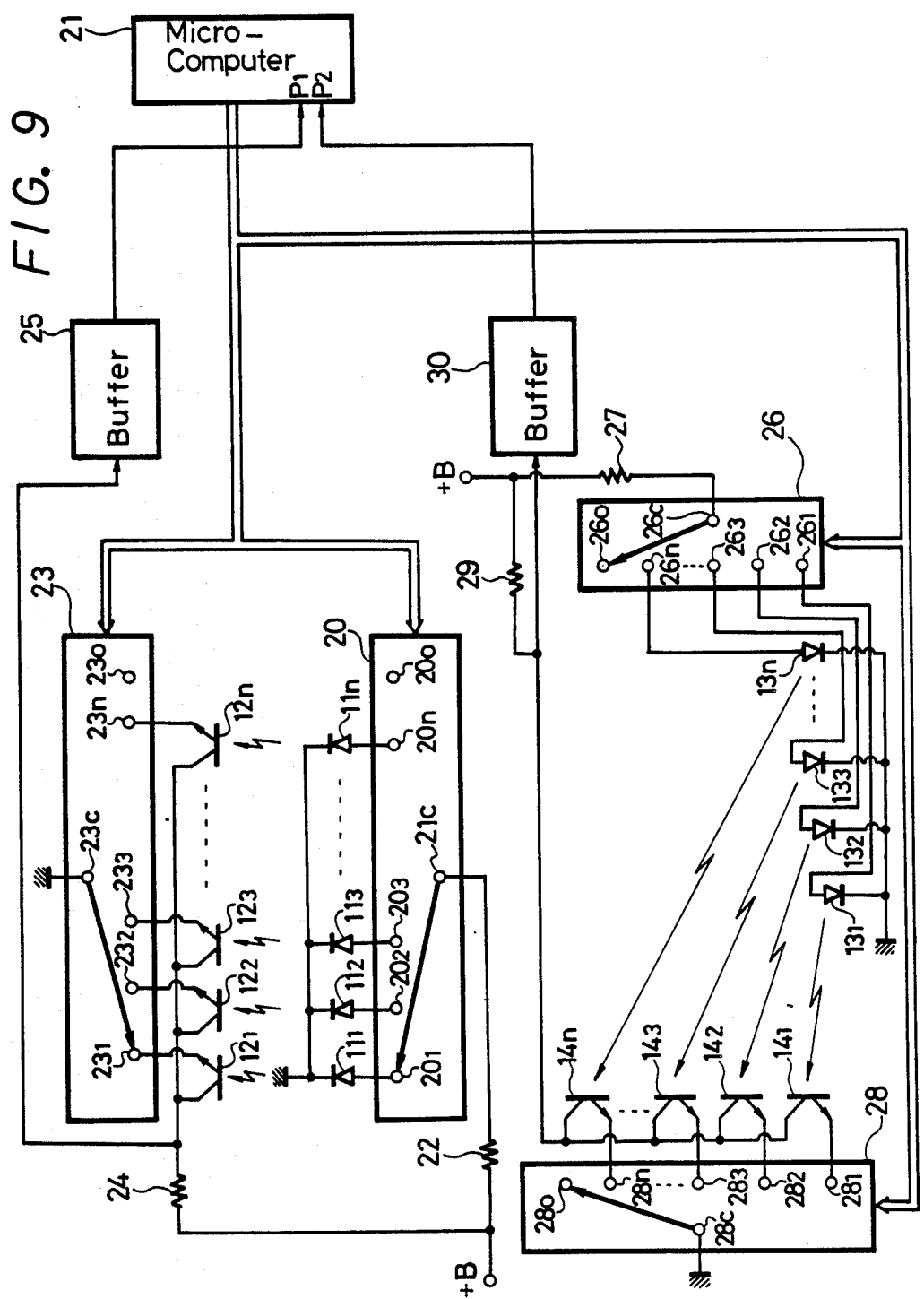
FIG. 9 is a schematic diagram showing the circuit arrangement of the first embodiment of the present invention.

FIG. 9 shows the circuit construction of an embodiment of the present invention, wherein light emitting diodes $11_1$-$11_n$ and photo-transistors $12_1$-$12_n$ are aligned along the curved plane of the CRT, as mentioned above, and the light emitting diodes $13_1$-$13_n$ and photo-transistors $14_1$-$14_n$ are aligned in a photo detecting or coupling relationship in an oblique direction.

Reference numeral 20 designates a selector which scans over, i.e. sequentially switches to the light emitting diodes $11_1$-$11_n$ in response to a control signal from a microcomputer 21 for specifying the address. Fixed terminals $20_1$-$20_n$ of the selector 20 are respectively connected to the anodes of the light emitting diodes $11_1$-$11_n$, while its movable terminal $20_c$ is connected to a positive power supply terminal +B through a resistor 22. The selector 20 also has an opened fixed terminal $20_o$. The cathodes of the light emitting diodes $11_1$-$11_n$ are connected in common and grounded.

Reference numeral 23 designates a selector which sequentially switches to the photo-transistors $12_1$-$12_n$ in response to a control signal from the microcomputer 21 for specifying the address. Fixed terminals $23_1$-$23_n$ of the selector 23 are respectively connected to the emitters of the photo-transistors $12_1$-$12_n$, while its movable terminal $23_c$ is grounded. The selector 23 also has an opened fixed terminal $23_o$. The collectors of the photo-transistors $12_1$-$12_n$ are connected in common to the positive power supply terminal +B through a resistor 24 and to a first port terminal $P_1$ of the microcomputer 21 through a buffer circuit 25.

Reference numeral 26 designates a selector which sequentially connects to the light emitting diodes $13_1$-$13_n$ in response to a control signal from the microcomputer 21 for specifying the address. Fixed terminals $26_1$–$26_n$ of the selector 26 are respectively connected to the anodes of the light emitting diodes $13_1$–$13_n$, while its movable terminal $26_c$ is connected to its positive power supply terminal +B through a resistor 27. The selector 26 also has an opened fixed terminal $26_o$. The cathodes of the light emitting diodes $13_1$–$13_n$ are connected in common and grounded.

Reference numeral 28 designates a selector which sequentially connects to the photo-transistors $14_1$–$14_n$ in response to a control signal from the microcomputer 21 for specifying the address. Fixed terminals $28_1$–$28_n$ of the selector 28 are respectively connected to the emitters of the photo-transistors $14_1$–$14_n$, while its movable terminal $28_c$ is grounded. The selector 28 also has an opened fixed terminal $28_o$. The collectors of the photo-transistors $14_1$–$14_n$ are connected in common to the positive power supply terminal +B through a resistor 29 and to a second port terminal $P_2$ of the microcomputer 21 through a buffer circuit 30. Though not shown in the drawing, the microcomputer 21 is coupled to a host computer which is connected to the CRT 10.

Reference is next made to the operation of the circuit (the present embodiment) shown in FIG. 9.

The microcomputer 21 periodically generates the control signal which specifies the address to make the selector 20 sequentially scan the light emitting diodes $11_1$–$11_n$ and selector 23 sequentially scan the photo-transistors $12_1$–$12_n$ in correspondence to the change-over operation of the selector 20. Therefore, every time the light emitting diodes $11_1$–$11_n$ and the photo-transistors $12_1$–$12_n$ are selected, they are synchronously energized in a sequential manner.

Specifically, when the light emitting diode $11_1$, for example, is turned on, the infra-red beam is emitted therefrom and received by the photo-transistor $12_1$. When the light emitting diode $11_2$ is next turned on, the infra-red beam is emitted therefrom and received by the photo-transistor $12_2$, and so on.

Then, signals generated from the photo-transistors $12_1$–$12_n$ by the infra-red beams received thereby are sequentially supplied to the first port terminal $P_1$ of the microcomputer 21 through the buffer circuit 25. It can therefore be said that the preliminary coordinates in the H direction is substantially set to the microcomputer 21.

If a finger is interposed between one of the pairs of the light emitting diodes $11_1$–$11_n$ and the photo-transistors $12_1$–$12_n$ in the above-mentioned condition, the infra-red beam emitted from the concerned light emitting diode in the on-state is interrupted by the finger so that the corresponding photo-transistor cannot receive the infra-red beam. Consequently, the microcomputer 21 is not supplied at the first port terminal $P_1$ with the signal from the photo-transistor, thereby making it possible to detect the preliminary position of the finger in the H direction.

Further, the microcomputer 21 generates periodically the control signal which specifies the address to make the selector 26 sequentially scan the light emitting diodes $13_1$–$13_n$ and selector 28 sequentially scan the photo-transistors $14_1$–$14_n$ in correspondence to the change-over operation of the selector 26. Therefore, every time the light emitting diodes $13_1$–$13_n$ and the photo-transistors $14_1$–$14_n$ are selected, they are synchronously energized in a sequential manner.

Specifically, when the light emitting diode $13_1$, for example, is turned on, the infra-red beam is emitted therefrom and received by the photo-transistor $14_1$. When the light emitting diode $13_2$ is next turned on, the infra-red beam is emitted therefrom and received by the photo-transistor $14_2$, and so on.

Then, signals generated from the photo-transistors $14_1$–$14_n$ by the infra-red beams received thereby are sequentially supplied to the second port terminal $P_2$ of the microcomputer 21 through the buffer circuit 30. It can be therefore said that the preliminary coordinate in the V direction is substantially set to the microcomputer 21.

If a finger is interposed between one of the pairs of the light emitting diodes $13_1$–$13_n$ and the photo-transistors $14_1$–$14_n$ in the above-mentioned condition, the infra-red beam emitted from the concerned light emitting diode in the on-state is interrupted by the finger so that the corresponding photo-transistor cannot receive the infra-red beam. Consequently, the microcomputer 21 is not supplied at the second port terminal $P_2$ with the signal from the photo-transistor, thereby making it possible to detect the preliminary position of the finger in the V direction.

Next, the coordinates detected by the microcomputer 21 are converted to the objective coordinates. For example, if the coordinate values detected as described above are assumed to be preliminary coordinate values (MY, NX), the objective coordinate values (H, V) in the orthogonal coordinates corresponding to the preliminary coordinate values (MY, NX) are previously stored in a ROM conversion table built into the microcomputer 21. Therefore, the true objective coordinate values (H, V) can be derived by performing a lookup conversion (MY, NX)→(H, V). One of the selectors 20 and 23 may have its opened fixed terminal $20_o$ or $23_o$ connected to the movable terminal $20_c$ or $23_c$ to be rendered inoperative when the other is in the operating condition. In the same manner, one of the selectors 26 and 28 may have its opened fixed terminal $26_o$ or $28_o$ connected to the movable terminal $26_c$ or $28_c$ to be rendered inoperative when the other is in the operating condition.

Although the infra-red beams between the light emitting diodes $13_1$–$13_n$ and the photo-transistors $14_1$–$14_n$ are not illustrated in parallel in FIG. 9, because of the drawing space, it will be understood that they are emitted in parallel to each other, as shown in FIGS. 1 and 6, and on the same plane as the infra-red beams between the light emitting diodes $11_1$–$11_n$ and the photo-transistors $12_1$–$12_n$.

As described above, the present embodiment is arranged such that the preliminary position in the H direction of an infra-red beam interrupted by a finger is detected by the use of the photo coupling means comprised of the light emitting diodes $11_1$–$11_n$ and the photo-transistors $12_1$–$12_n$ and the preliminary position in the V direction of an infra-red beam (skewed beam) interrupted by the finger is detected by the use of the photo coupling means comprised of the light emitting diodes $13_1$–$13_n$ and the photo-transistors $14_1$–$14_n$ and these preliminary coordinates are then converted to the objective coordinates, thereby making it possible to detect the true coordinate values designated by the finger.

Figure 10:
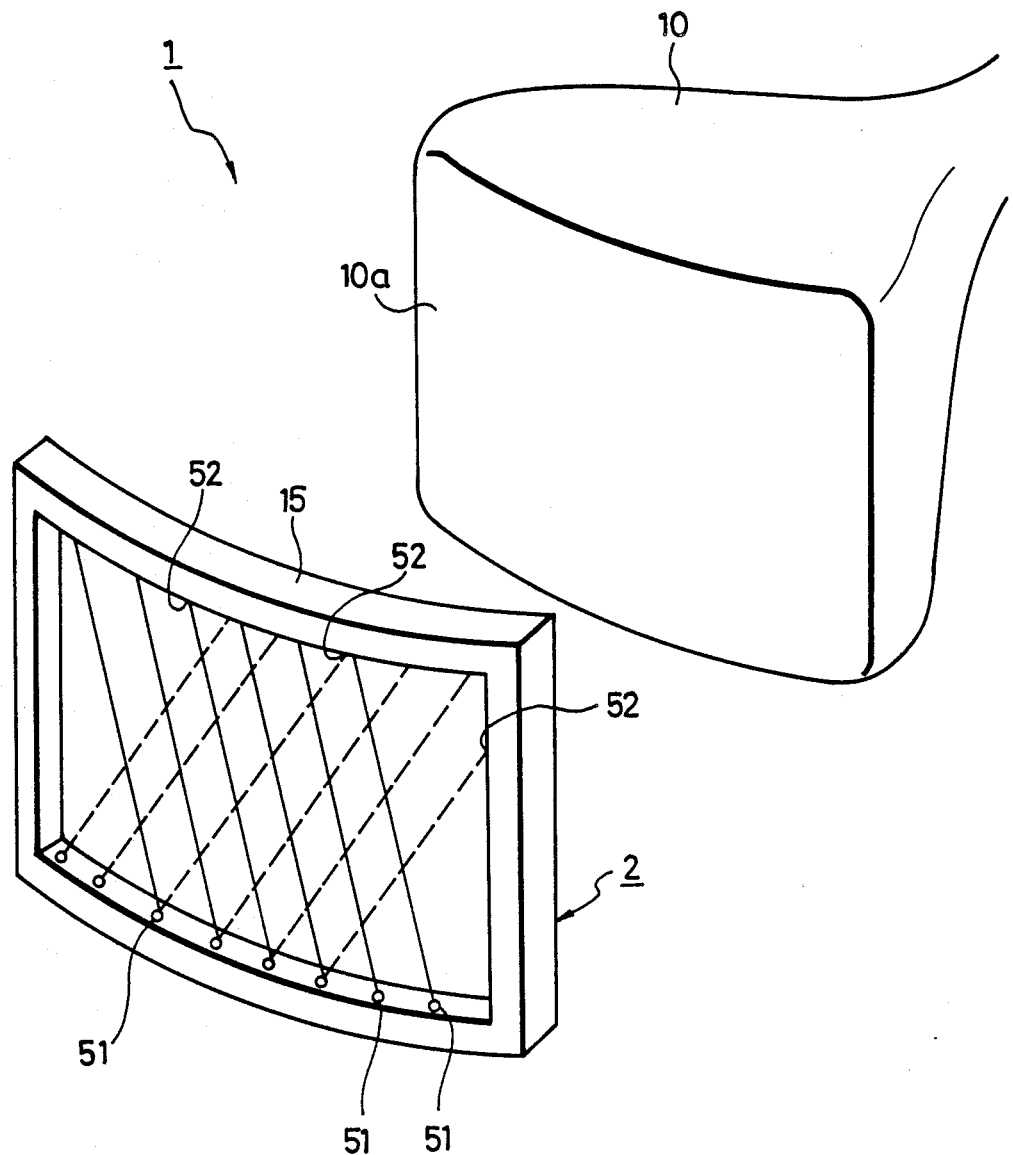
FIG. 10 is an exploded perspective view of a second embodiment of a touch panel apparatus according to the present invention.

FIG. 10 shows another embodiment of the present invention in which a touch panel apparatus 1 is composed of a CRT 10 having a cylindrical display surface 10a and a coordinate detecting device 2 incorporated in a bezel 15 attached to the CRT 10, similar to the foregoing first embodiment.

The coordinate detecting device 2, though not shown, comprises four printed circuit boards arranged on the four sides of the CRT 10, in the same manner as the first embodiment. On the printed circuit boards on the bottom side and both lateral sides there are aligned a plurality of light emitting elements, for example, light emitting diodes 51 along the curved plane of the CRT 10, while on the printed circuit boards on the top side and both lateral sides there are aligned a plurality of light receiving elements, for example, photo-transistors 52 arranged opposite to the light emitting diodes 51 to establish the photo coupling relationship therebetween. Among the skewed beams emitted from the light emitting diodes 51 and directed to the photo-transistors 52, those indicated by solid lines in FIG. 10 are leftwardly skewed beams (X beams) and those indicated by broken lines in FIG. 10 are rightwardly skewed beams (Y beams). The light emitting diodes 51 are scanned by a selector provided in the printed circuit board similar to the first embodiment of the present invention, and the photo-transistors 52 are also scanned synchronously with the light emitting diodes 51 by a similar selector provided in the printed circuit board. The objective coordinates are optically detected by the light coupling means formed of the light emitting diodes 51 and the photo-transistors 52.

In the coordinate detecting device 2 of the first embodiment shown in FIG. 1, the horizontal position detecting beams (Y beams) are directed upwardly from the bottom side without skew. On the other hand, in the second embodiment as shown in FIG. 10, the X beams and Y beams are both skewed.

Figure 11:
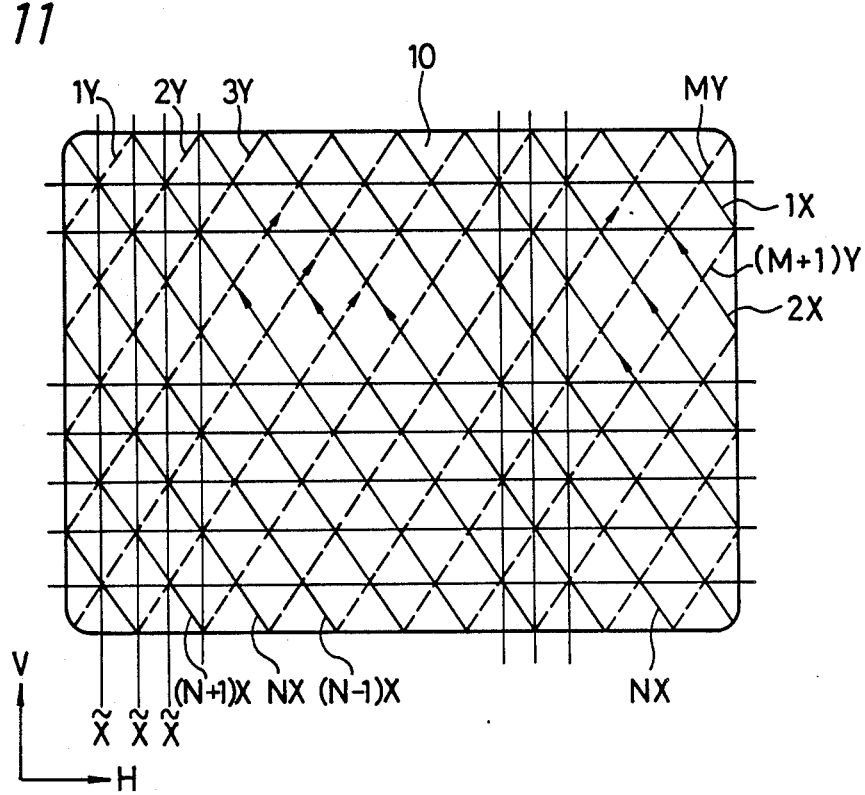
FIG. 11 is a diagram used for explaining a coordinate transformation according to the second embodiment of the invention.

The second embodiment also requires a coordinate conversion between the coordinate detecting device 2 and the CRT 10. For such a conversion, there are provided in a ROM look up table (not shown) within the microcomputer 21 objective coordinate values (H, V) corresponding to the preliminary coordinate values (MY, NX) (refer to FIG. 11) which are detected by interrupting the rightwardly skewed beams (Y beams) and the leftwardly skewed beams (X beams) with a finger, whereby the conversion from (MY, NX) to (H, V) is performed.

Thus, the second embodiment can also provide a touch panel apparatus which minimizes the parallax problem.

The above description is given of preferred embodiments of the invention but it will be apparent that many modifications and variations could be effected by one skilled in the art without departing from the spirit or scope of the novel concepts of the invention so that the scope of the invention should be determined by the appended claims only.

We claim as our invention:

1. A touch panel apparatus to be attached to a display device having a substantially cylindrical display surface, comprising:
   a first set of plural light source—photo-detector pairs for generating and detecting a first set of parallel light beams passing across the cylindrical display surface of the display;
   a second set of plural light source—photo-detector pairs for generating a second set of parallel light beams passing across the cylindrical display surface of the display, wherein the first and second sets of light beams are non-parallel to a plane which is perpendicular to the cylindrical axis of the cylindrical display surface; and
   a process circuit connected to the first and second sets of light source—photo-detector pairs for determining coordinates by detecting interrupted light beams.

2. A touch panel as recited in claim 1, wherein one of said sets of parallel light beams are aligned perpendicular to a plane which is perpendicular to the cylindrical axis of said cylindrical display surface.

3. A touch panel as recited in claim 1, wherein said first set of light beams have positive angles relative to said plane which is perpendicular to the cylindrical axis of said cylindrical display surface, and said second set of light beams have negative angles relative to said plane which is perpendicular to the cylindrical axis of said cylindrical display surface.

4. A touch panel as recited in claim 1, wherein each of said light source—photo-detector pairs generate an electrical output signal indicative of whether the passage of the light beam from the light source to the photo detector is interrupted and the process circuit sequentially energizes each light source and monitors the output of each photo-detector of each light source—photo-detector pair to generate a first set of coordinates for each point of interruption of the light beams.

5. A touch panel as recited in claim 4, wherein said process circuit converts set of coordinates to a second set of corresponding orthogonal coordinates.

6. In combination, a touch panel as recited in claim 1 and a display device having a substantially cylindrical display surface.

7. The combination as recited in claim 6 wherein the display device is a cathode ray tube.

8. In combination, a touch panel as recited in claim 2 and a display device having a substantially cylindrical display surface.

9. In combination, a touch panel as recited in claim 3 and a display device having a substantially cylindrical display surface.

10. In combination, a touch panel as recited in claim 4 and a display device having a substantially cylindrical display surface.

* * * * *